US006178032B1

(12) United States Patent
Huang et al.

(10) Patent No.: US 6,178,032 B1
(45) Date of Patent: Jan. 23, 2001

(54) INTENSITY MODULATOR WITH OPTIMUM EXTINCTION RATIO OF AN OUTPUT OPTIC PULSE

(75) Inventors: Shih-Chu Huang, Kaohsiung; Jiunn-Song Tsay, Pingtung, both of (TW)

(73) Assignee: Chung-Shan Institute of Science and Technology, Taoyuan (TW)

( * ) Notice: Under 35 U.S.C. 154(b), the term of this patent shall be extended for 0 days.

(21) Appl. No.: 09/316,663

(22) Filed: May 21, 1999

(51) Int. Cl.[7] .................................. G02F 1/00; G02F 1/07
(52) U.S. Cl. .............................. 359/237; 359/264
(58) Field of Search .......................... 359/154, 173, 359/181, 237, 264

(56) References Cited

U.S. PATENT DOCUMENTS

| | | | |
|---|---|---|---|
| 4,910,458 | * 3/1990 | Forsyth et al. | 324/158 |
| 5,132,828 | * 7/1992 | Conner et al. | 359/173 |
| 5,652,669 | * 7/1997 | Liedenbaum | 359/158 |

* cited by examiner

Primary Examiner—Ricky Mack
(74) Attorney, Agent, or Firm—Jiawei Huang; J. C. Patents

(57) ABSTRACT

An optical intensity modulator with optimized extinction ratio (ER) is provided. The optical intensity modulator has a modulator used to receive a light source, such as a laser source, and export an optical pulse. An optical divide is used to receive the optical pulse and decouple it into a first optical pulse and a second optical pulse. An optical receiver is used to receive the first optical pulse and convert it into an electrical pulse signal. A signal processor is used to receive the electrical pulse signal from the optical receiver and digitize it into a digital reference signal. A DC-bias generator coupled to the signal processor and the modulator is used to provide a precise DC bias to the modulator according to an output of the signal processor. A current reference signals is compared with a previous reference signals and is adjusted in the signal processor so as to obtain the precise DC bias. The optical intensity modulator further includes a pulse generator, used to provide a pulse signal for the modulator and a trigger signal to the signal processor.

22 Claims, 7 Drawing Sheets

INTENSITY MODULATOR WITH OPTIMUM EXTINCTION RATIO OF AN OUTPUT OPTIC PULSE

BACKGROUND OF THE INVENTION

1. Field of the Invention

This invention relates to a waveform modulator, and more particularly to an optic intensity modulator.

2. Description of Related Art

Currently, fiber optic sensors have been developed for a wide range of applications, in which a time division multiplexing (TDM) technology is a typical technology used in modern communications and fiber optic sensor network. TDM of the fiber optic sensor network has advantages of low crosstalk and simple construction. Particularly, TDM of fiber optic interferometric sensors has been shown to have the lowest crosstalk and optimum sensitivity as referred to a published paper on "J. Lightwave Technol., LT-5,pp. 1014–1023, 1987". In a TDM fiber optic sensor system, a continuous-wave laser source can be externally modulated by an intensity modulator to generate an optic pulse. The output optic pulse of the intensity modulator with high extinction ratio (ER) is a key issue to increase the sensor sensitivity and to reduce the sensor crosstalk, especially for a TDM fiber interferometric sensor system, as referred to a published paper on J. Lightwave Technol., VOL. 14, NO.6, 1488–1500,1996.

It is very important in a TDM fiber optic sensor system to select an intensity modulator with high ER (typical ER≧30 dB) and to control the output optic pulse of an intensity modulator with optimum ER.

SUMMARY OF THE INVENTION

It is at least an objective of the present invention to provide an optical intensity modulator with optimized ER so as to obtain an optimum ER of an output optical pulse.

It is at least still another objective of the present invention to provide an optical intensity modulator with optimized ER by adjusting a direct current (DC) bias so as to obtain an optimum ER of an output optical pulse.

It is at least still yet another objective of the present invention to provide an optical intensity modulator with optimized ER, which is controlled by an automatic method.

In accordance with the foregoing and other objectives of the present invention, an optical intensity modulator with optimized ER is provided. The optical intensity modulator includes a modulator used to receive a light source, such as a laser source, and export an optical pulse. An optical divider, such as a fiber coupler, is used to receive the optical pulse and divide it into a first optical pulse and a second optical pulse. An optical receiver is used to receive the first optical pulse and convert it into an electrical pulse signal. A signal processor is used to receive the electrical pulse signal from the optical receiver and digitize it into a digital reference signal. A DC-bias generator coupled to the signal processor and the modulator is used to provide a DC bias to the modulator according to an output of the signal processor. The optical intensity modulator further includes a pulse generator used to provide a pulse signal for the modulator and a trigger signal to the signal processor. The pulse signal and the trigger signal can, for example, come from the pulse output and the trigger output of the pulse generator, respectively.

In the foregoing, a continuous-wave laser light is externally modulated into an optical pulse signal by the modulator. The optical pulse is received by the optical receiver and converted into an electrical pulse signal. The electrical pulse signal is processed by the signal processor so as to produce a reference signal. According to the reference signal, the DC-bias generator produces a feedback of precise DC bias to the modulator so as to optimize an ER ratio of the optical pulse. A current one of thereference signal is also compared with a previous one of the reference signal and is adjusted in the signal processor so as to obtain the precise DC bias.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 1:
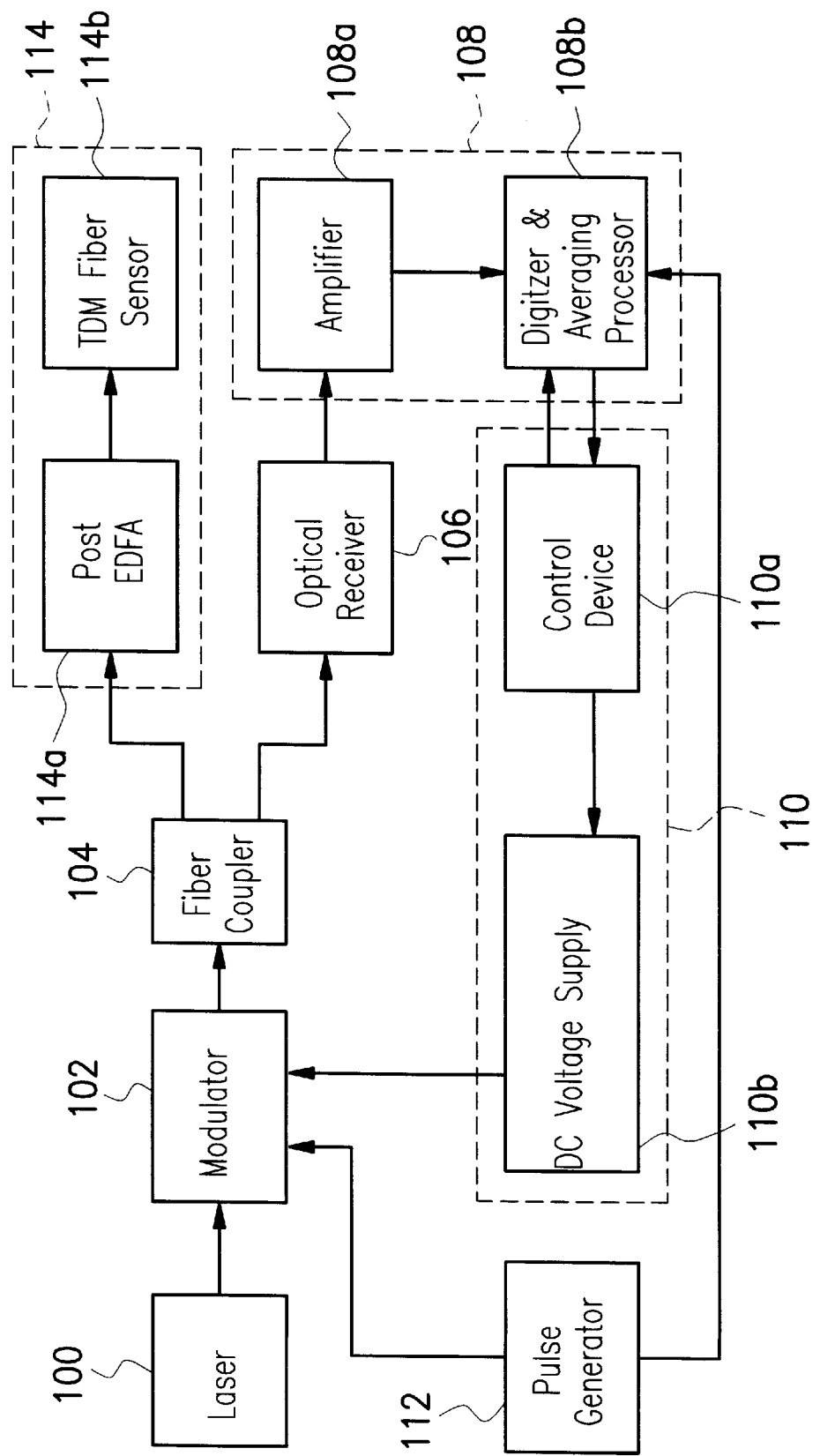
FIG. 1 is a block diagram, schematically illustrating a control scheme to maintain the optimum extinction ratio of the output optical pulse of an intensity modulator, according to a preferred embodiment of the invention.

The extinction ratio (ER) of an optical pulse typically is calculated by $$ER = 10 \log\left(\frac{P_H}{P_L}\right) = 10 \log\left(\frac{V_H}{V_L}\right), \quad (1)$$

where $P_H$ and $P_L$ are high level and low level light power of the optical pulse, $V_H$ and $V_L$ respectively are their waveform voltages of the optical pulse, received by optical receivers. In a TDM fiber optic sensor system, a continuous-wave laser source can be externally modulated by an intensity modulator to generate optical pulse. For example, an optical-guided-wave electro-optical intensity modulator exports light intensity I as a function of electrode voltage $V_e$ can be expressed as $$I = I_0 \cos^2\left(\frac{\pi V_e}{2V_\pi} + \frac{\phi_{SPS}}{2}\right), \quad (2)$$

where $V_\pi$ is the half-wave voltage required to change I from a maximum to a minimum value, $\phi_{SPS}$ is the static phase shift, as referred to R. A Becker on "IEEE J. Quantum Electron., Vol. QE-20,pp. 723–727, 1984. In general, an optical-guided-wave intensity modulator includes a high impedance (>1000Ω) DC bias electrode and a 50Ω impedance RF (radio frequency) electrode. In the invention, a pulse generator and a precision DC voltage supply are respectively used to drive an optical-guided-wave (OGW) intensity modulator through the RF electrode and the DC bias electrode. The input electrical pulse (with zero offset) amplitude generated by the pulse generator remains at $V_\pi$, typically about 4–5 volts, of the OGW intensity modulator so as to obtain the output optical pulse with maximum amplitude and ER, which is i.e. high-level light intensity approximates $I_0$ and low-level light intensity approximates zero, for $\phi_{SPS}=-\pi/2$. The $\phi_{SPS}$ of the OGW can be set to quadrature (i.e. $\phi_{SPS}=-\pi/2$) during the manufacturing process, therefore, the applied voltage for generating the high-level light and low-level light of the output optical pulse are $V_\pi/2$ and $-V_\pi/2$ (for RF electrode), respectively. DC voltages should not be applied to the RF electrode because the associated currents cause unnecessary heating to induce operating point instability. For digital communication system, the average duty-cycle of the optical pulse approximate ½, the effective DC voltage of the applied voltage (high~$V_\pi/2$, low~$-V_\pi/2$) of the RF electrode is zero. For a TDM sensor application, a low-duty-cycle optical pulse is required, the effective DC voltage of the previous applied voltage (high~$V_\pi/2$, low~$-V_\pi/2$) is slightly larger than $-V_\pi/2$. The applied voltages of the RF electrode is adjusted with high $V_\pi-V_L$, in which $V_L$ is a small voltage, and low $-V_L$ to fit the requirement with zero effective DC voltage. Therefore, the suitable bias voltage $V_{BIAS}$ generated by a precision DC voltage supply must be applied to the DC bias electrode for changing $\phi_{SPS}$ to obtain the output optical pulse with maximum amplitude and ER. However, the optimum voltage $V_{BIAS}$ is gradually varied since the currents cause heating and some unfamiliar factors. The $\phi_{SPS}$ can be compensated by precisely adjusting the optimum voltage $V_{BIAS}$ so as to maintain the output optical pulse with maximum ER. A typical range of the $V_{BIAS}$ of the OGW intensity modulator is about from −15V to 15V. The invention provides a control method to precisely control the precision DC voltage supply so as to allow the ER to remain at an optimum condition.

FIG. 1 is a block diagram, schematically illustrating a control scheme to maintain the optimum extinction ratio of the output optical pulse of an intensity modulator, according to a preferred embodiment of the invention. In FIG. 1, the intensity modulator of the invention is used to modulated a continuous-wave laser light from a laser light source 100 into an optical pulse with optimized ER. The intensity modulator includes a modulator 102 used to receive the continuous-wave laser light from a light source, such as the laser light source 100, and export an optical pulse. An optical divider 104, such as a fiber coupler 104, is used to receive the optical pulse and divide it into a first optical pulse and a second optical pulse. An optical receiver 106 is used to receive the first optical pulse and convert it into an electrical pulse signal. A signal processor 108 is used to receive the electrical pulse signal from the optical receiver 106 and process it into a digital reference signal. A DC-bias generator 110 coupled to the signal processor 108 and the modulator 102 is used to provide a precise DC bias to the modulator 102, according to an output of the signal processor 108. The intensity modulator further includes a pulse generator 112 used to provide a pulse signal for the modulator and a trigger signal to the signal processor. The pulse signal and the trigger signal can come from the pulse output and the trigger output of the pulse generator 112, respectively. The optical divider 104 preferably includes the fiber coupler so as to have a better dividing effect. The signal processor 108 can further includes, for example, an amplifier 108a and a signal processing unit 108b. The amplifier 108a receives and amplifies the electrical pulse signal from the optical receiver 106. The signal processing unit 108b processes the amplified electrical pulse signal. The DC-bias generator 110 includes, for example, a control device 110a and a DC power supply 110b.

Further descriptions about the operation of the intensity modulator of the invention continue. FIGS. 2–5 shows effects in an experiment as the intensity modulator shown in FIG. 1 is operated. In order to see the effects of the invention, a distributed feedback laser diode (DFB-LD) is, for example, used to serve as the laser light source 100, which has power of about 10 mW and wavelength of about 1542 nm. The modulator 102 includes, for example, a $LiNbO_3$ optical-guide wave (OGW) intensity modulator, which is controlled by the DC-bias generator 110 and the pulse generator 112 and produces the optical pulse with a pulse repetition rate of about 880 kHz and a pulse width of about 80 ns.

Figure 2:
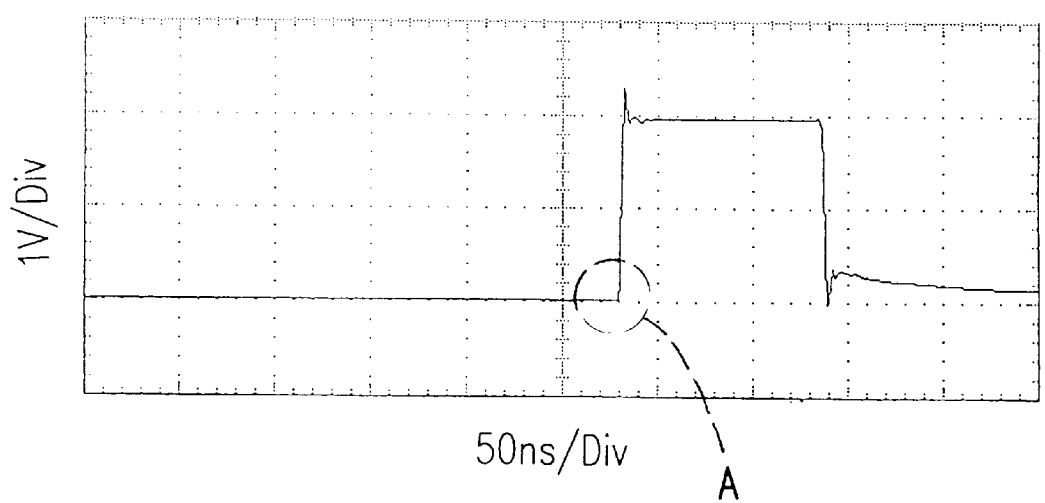
FIG. 2 is a pulse waveform, schematically illustrating an output waveform from the optical receiver, according to a preferred embodiment of the invention.

The optical receiver 106 includes, for example, an InGaAs PIN optical receiver, is used to monitor the ER of the first optical pulse from the optical divider 104 with about 90% of the optical pulse. The second optical pulse with about 10% of the optical pulse is amplified by an optical amplifier, such as an erbium-doped fiber amplifier (EDFA) 114a or a semiconductor optical amplifier, and then launched into a time division multiplexing (TDM) fiber optic sensor 114b. A continuous-wave saturation power and a maximum pulse power of the optical receiver 106 respectively are about 60 µW and 5 mW at about 1550 nm. Its conversion gain is about $4 \times 10^4$ V/W at 1550 nm. In the experiment, a digital oscilloscope with some function can be used to completely substitute the signal processor 108 to perform, for example, amplifying, digitizing, and averaging functions. Thus, the signal processor 108 includes, for example, the amplifier 108a and the signal processing unit 108b, which further includes, for example, a digitizer and an averaging processor. A waveform of the received optical pulse is displayed on the digital oscilloscope with a trigger signal coming from the pulse generator 112 in the experiment, in which the waveform of the received optical pulse is digitized. The waveform of the optical pulse received by the digital oscilloscope is shown in FIG. 2. A peak power of the optical pulse is over 60 µW but less than 5 mW so as to prevent the optical receiver 106 from damaging. The response of the high-level of the waveform is serious saturated for the receiver, therefore, the signal after the falling edge of the optical pulse became abnormal with large value. These values of the abnormal response are gradual decrease. To pass the most time of the periodic of the optical pulse, the response in the font of the rising edge of the optical pulse recovers almost normal performance. In this experiment, the low-level input power of the optical pulse increases more than 30 times than that of the optical receiver at the normal operation. The response of the receiver at the high-level is unsaturated for the normal operation. Therefore, although the ER of the optical pulse decreases slightly, the response at a region A of the low-level at the rising edge increases rapidly.

Figure 3A:
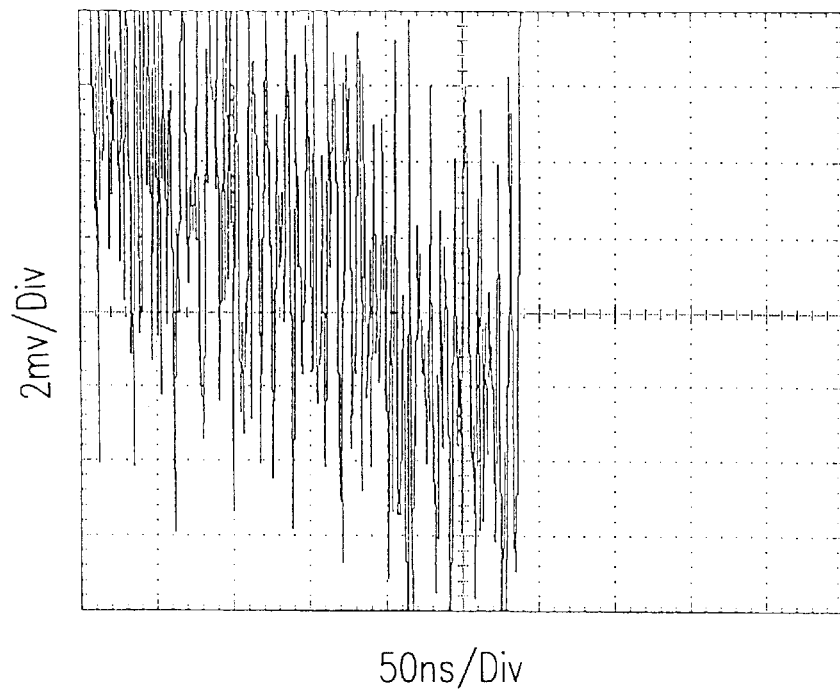
FIG. 3A is a pulse waveform, schematically illustrating an amplified waveform of the output waveform in FIG. 2 at a leading edge portion A in an enlarged scale.
Figure 3B:
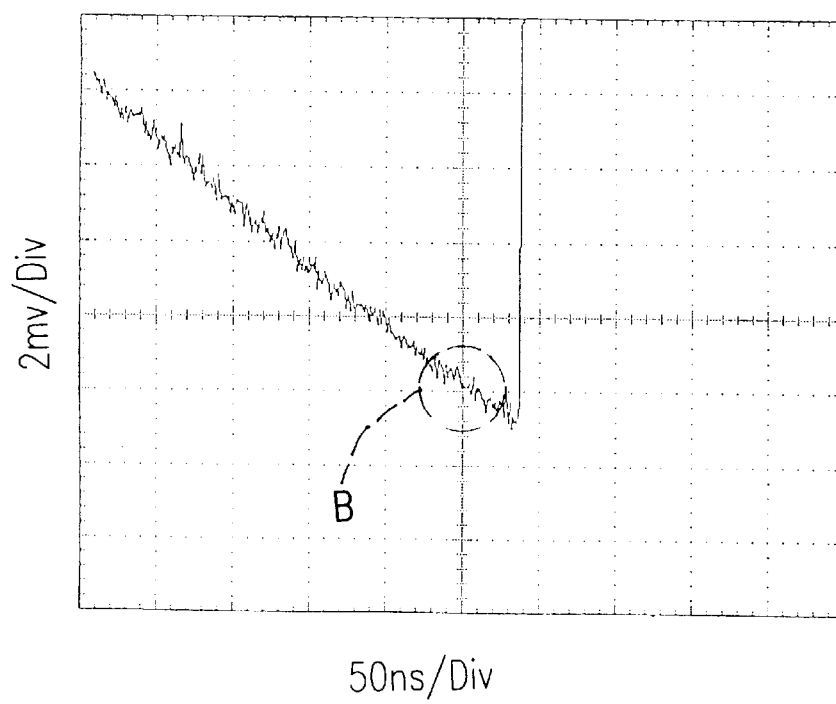
FIG. 3B is a pulse waveform, schematically illustrating an averaged waveform of the output waveform in FIG. 3A.

FIG. 3A is a pulse waveform, schematically illustrating an amplified waveform of the output waveform in FIG. 2 at a leading edge potion A in an enlarged scale. In FIG. 3A, the waveform of the optical pulse is amplified and digitized by the digital oscilloscope. The waveform in an enlarged scale shows severe large noise, which usually results from the laser light source 100. An averaging process is performed on each digitized sample point. For example, as an average over 300 times, an averaged waveform is obtained as shown in FIG. 3B, in which noise is effectively reduced.

The DC-bias generator 110 includes the control device 110a and the DC power supply 110b. The purpose of the control device 110a is to average a certain sufficient valley region of the waveform with reduced fluctuation noise so as to adjust a precise DC bias level to the modulator 102 and further achieve an optimization on a working DC bias level, or called an optimum DC bias. In the experiment, the control device 110a includes, for example, a general purpose interface bus (GPIB), which is, for example, controlled by a PC with a GPIB program designed in the invention for this purpose. The GPIB acquits a sufficiently large region B at the valley portion of the waveform as shown in FIG. 3B. An averaged voltage in the region B is obtained and is stored as a current reference voltage. The DC power supply 110b, according to the reference voltage, provides a DC bias to the modulator 102. The reference voltage reach an optimum condition by adjusting it back-and-forth. For example, for the initial cycle, after the first DC bias is sent to the modulator 102, the DC power supply 110b is controlled to send another DC bias with a little increment or decrement for the next cycle. For example, a DC bias with 1 mV decrement (or 1 mV increment), serving as a current DC bias, is sent to the modulator 102. The control device 110a obtains an updated current reference voltage, which is compared with the previous reference voltage. If the current reference voltage is less than or equal to the previous reference voltage, the current reference replaces the previous reference voltage for the next cycle. If the current reference voltage is greater than the previous reference voltage, a little increment is added into the DC bias. After repeating several cycles, the DC bias $V_{BIAS}$ reaches the optimized DC bias, which is provided to the modulator 102 with optimum ER.

Figure 6A:
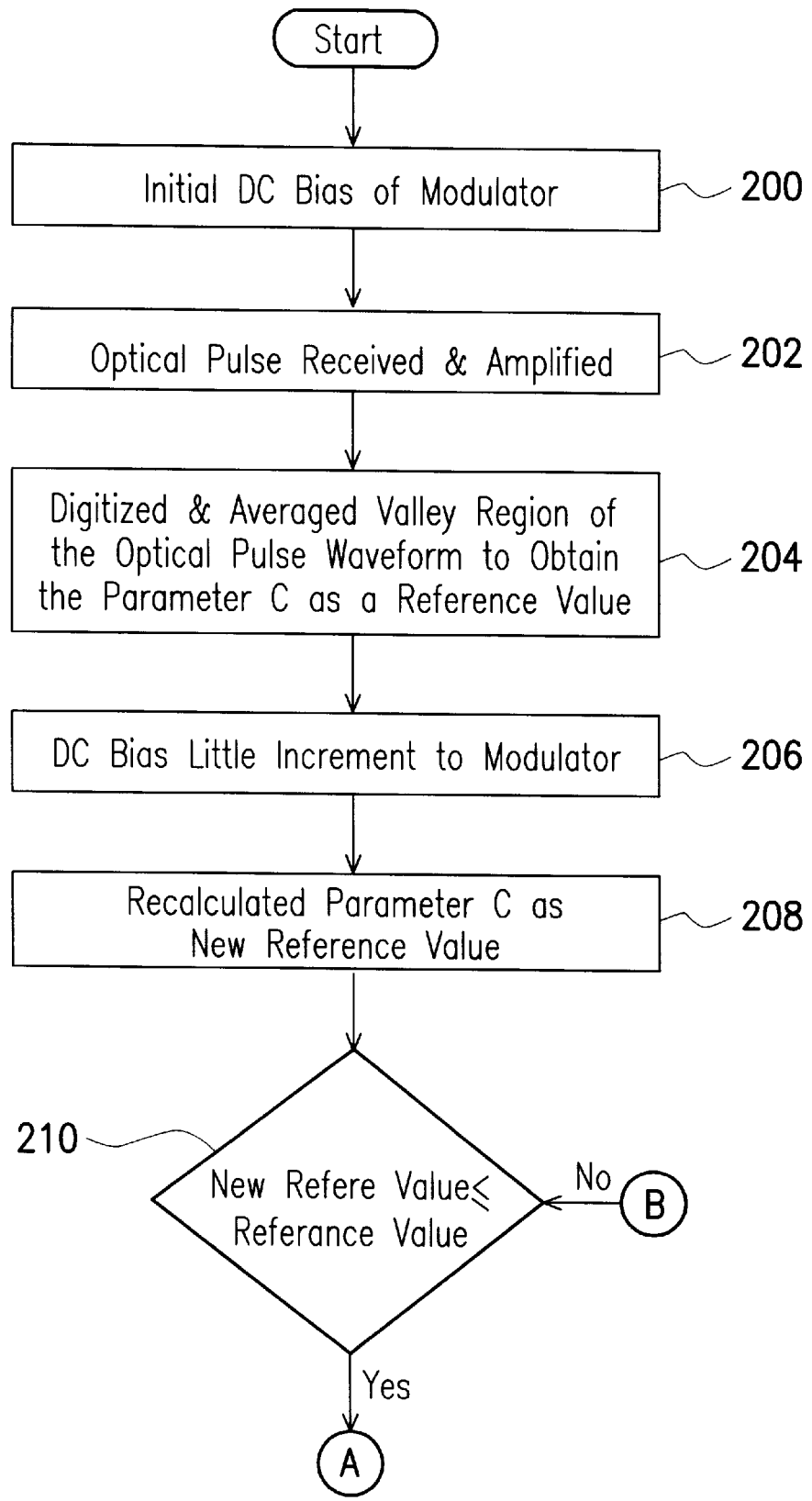
FIGS. 6A and 6B are flow chart, schematically illustrating the operating process of the optic intensity modulator, according to the preferred embodiment of the invention.
Figure 6B:
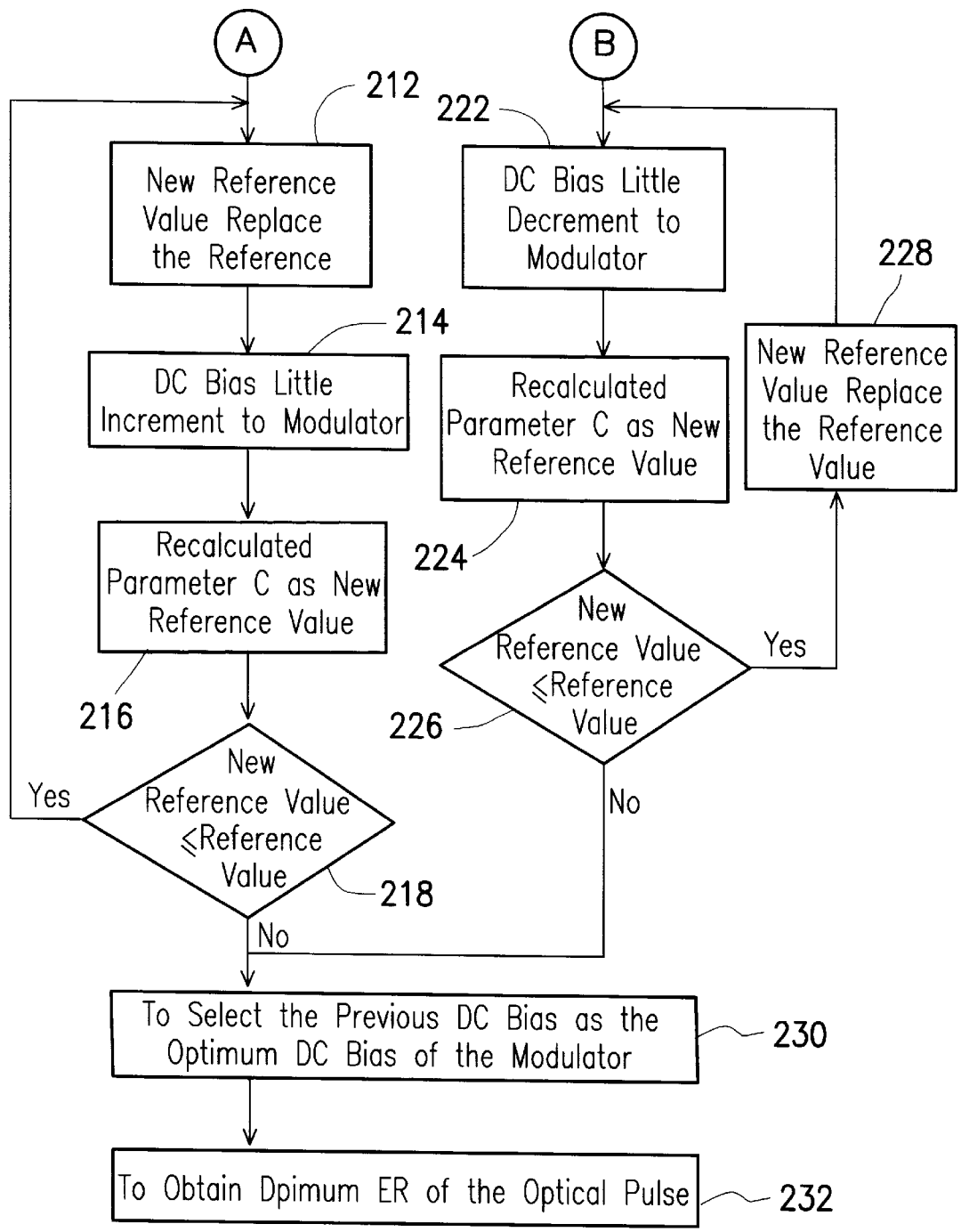

Two flow charts are shown in FIGS. 6A and 6B so as to illustrate the operation method on the optical intensity modulator with optimized ER.

Figure 4:
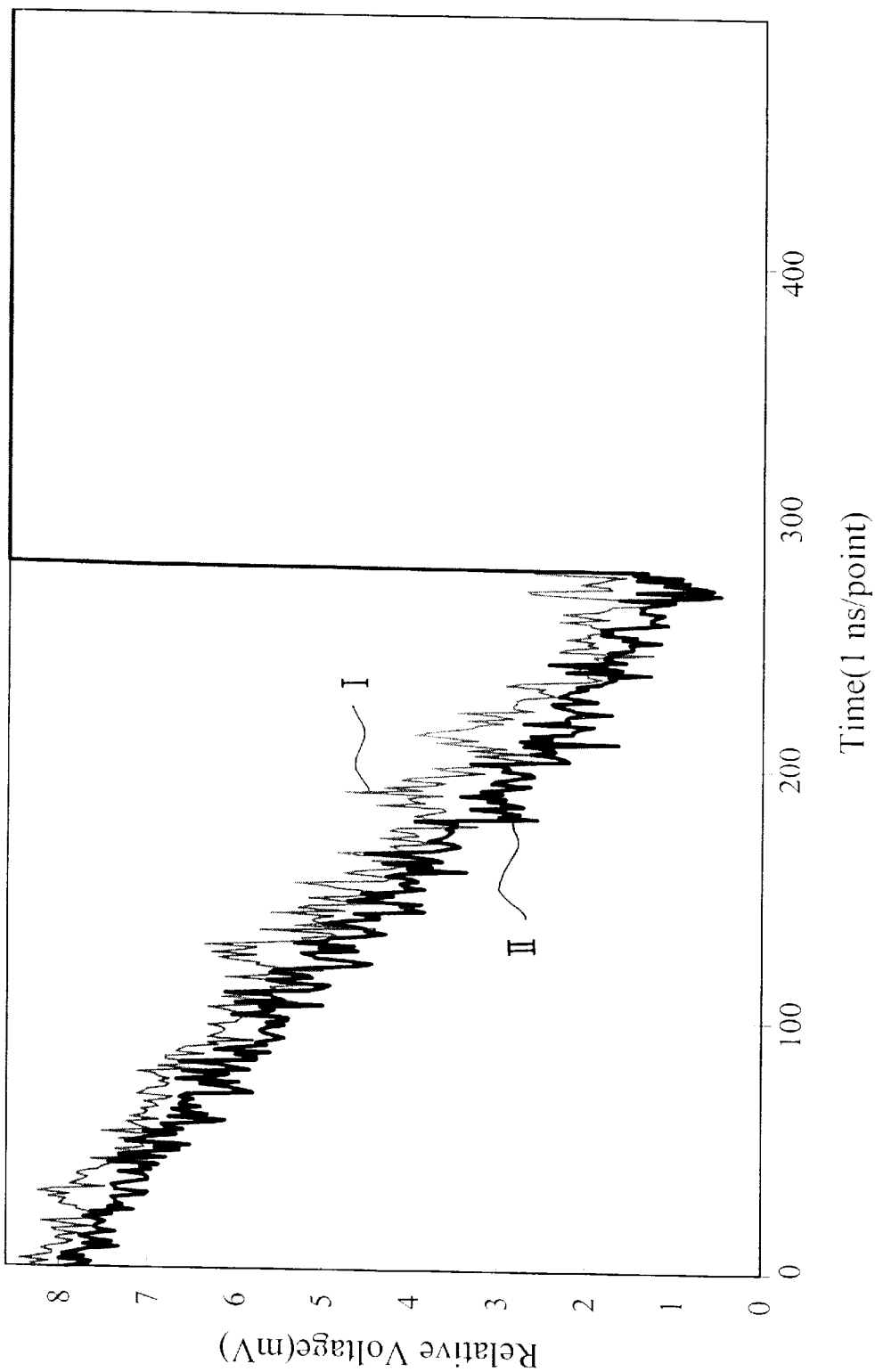
FIG. 4 is a waveform plot, schematically illustrating a waveform I plotted in light line without control effect, and a waveform II plotted in dark line with optimized control effect, according to the preferred embodiment of the invention.

The DC-bias power supply 110b is a precision power supply and the output DC voltage is necessary to be updated in a certain proper period, such as 5 minutes, so as to remain at the optimized voltage. FIG. 4 is a waveform plot, schematically illustrating a waveform I plotted in light line without control effect, and a waveform II plotted in dark line with optimized control effect, according to the preferred embodiment of the invention. In FIG. 4, the waveform I has an deviation from the optimized waveform II, in which the waveform I has a reference voltage of about 3.9 mV and the waveform II has a reference voltage of about 3.3 mV with a correction of 0.6 mV. This difference voltage (0.6 mv) is corresponding to a light intensity of $1.5 \times 10^{-5}$ mW. Comparing with the peak power of 2 mV, the ratio ($1.5 \times 10^{-5}/2$) is only about $7.5 \times 10^{-6}$, which is about −51 dB. So, the automatic control process at least has an ability to control the ER of an OGW with a sensitivity better than the light intensity variation of about $1.5 \times 10^{-5}$ mW for the low-level light power of the optical pulse.

Figure 5:
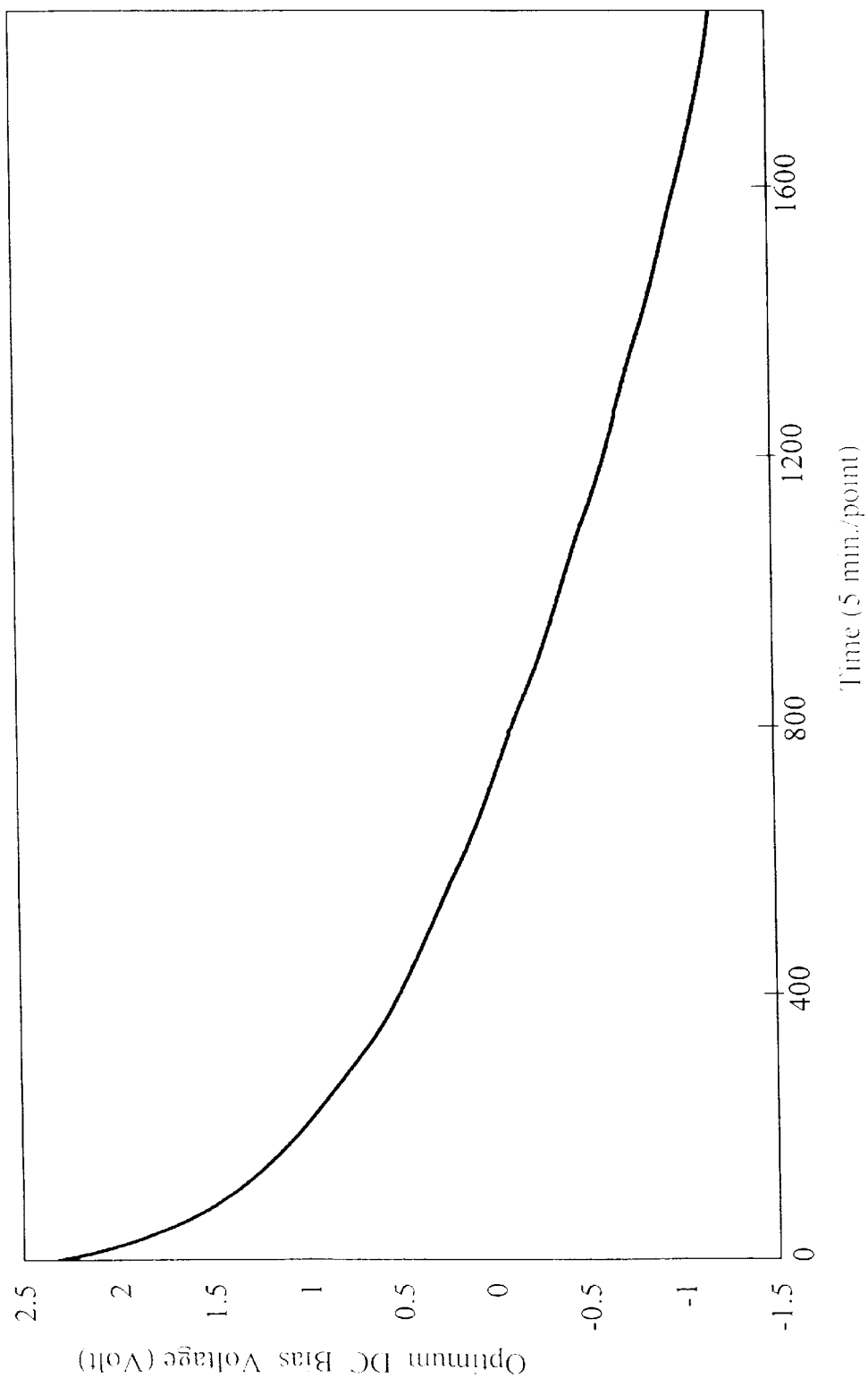
FIG. 5 is an output DC-bias curve, schematically illustrating the optimized DC-bias varying with time.

FIG. 5 is an output DC-bias curve, schematically illustrating the output optimum DC-bias varying with time. In the experiment, an actual value of the optimum ER is limited by the performance of the OGW intensity modulator 102 by about 33 dB, which is the optimum value and remains in the whole experiment. After a running period of 162 hours, the output optimum DC bias $V_{BIAS}$ reaches at about −1.205V with a varying rate of about 6 mV/hr.

In order to give a better picture about how to operate the optical intensity modulator of the invention, the operation flow diagram is shown in FIGS. 6A and 6B. In FIG. 6A and FIG. 1, as the modulator 102 is activated, a step 200 is performed to initialize a DC bias of the modulator. In step 202, the modulator 102 receives optical pulses from the laser light source 100 and exports the amplified the optical pulses. In step 204, the signal processor 108 selects a portion of the low-level (valley) region near to the leading edge for digitizing and averaging so as to obtain a parameter C as a reference value. In step 206, the DC bias is varied with a little increment. In step 208, the quantity of the parameter C is recalculated after the little variation. The parameter C serves as a new reference value.

In step 210, the new reference vale is compared with the previous reference value. If the new reference value less than the previous reference value then the step goes to an A process otherwise goes to a B process, in which the A and B processes are continuously shown in FIG. 6B. In FIG. 6B, If the process A is decided, the system goes to a step 212 for replacing the previous reference value with the new reference value for a current reference vale. In step 214, the DC bias of the modulator 102 is increased with the increment again. In step 216, like the step 204, a new parameter C is recalculated to obtain a new reference value. In step 218, the new reference value is compared with the current reference value. If the new reference value is less than the current reference vale then the system goes back to the step 212, otherwise the system goes to a step 230. If the result from the step 210 of FIG. 6A chooses the process B, the system goest to a step 222. In step 222, the DC bias of the modulator 102 is varied with a little decrement. In step 224 and 226 like the step 216 and 218, the new reference valued is compared with the current reference value. If the new reference vale is less than the current reference value, then the system goes to a step 228, like the step 212, and then goes to the step 212. Otherwise, the system goes to the step 230, which is a common step for the process A and the process B.

In step 230, the optimum DC bias of the modulator 102 is obtained by choosing the previous DC bias for the current reference value. In step 232, the optimum ER of the optical pulse is obtained.

In conclusion, in order to increase sensitivity and reduce crosstalk effect occurring in the TDM fiber sensor, It is important to optimize the ER of the input optical pulse for the TDM fiber sensor. The intensity modulator shown in FIG. 1 is provided by the invention to achieve the purposes of increasing sensitivity and reducing crosstalk effect through an automatic control method by using the signal processor 108 and the DC generator 10.

Moreover, the intensity modulator with optimized ER is an automatic control method, which can automatically reach the optimized ER and remains it.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. An optical intensity modulator with optimized extinction ratio (ER), suitable for a use for converting a light source into a pulse waveform, intensity modulator comprising:

a modulator, used to receive the light source and export an optical pulse;

an optical divider, used to receive the optical pulse and divide the optical pulse into a first optical pulse and a second optical pulse;

an optical receiver, used to receive the first optical pulse and convert the first optical pulse into an electrical pulse signal;

a signal processor, used to receive and amplify the electrical pulse signal from the optical receiver, digitize the electrical pulse signal into a digital pulse signal, average to reduce noise of the digital pulse signal, and obtain a reference value; and a DC-bias generator, which is coupled to the signal processor and the modulator so as to provide a DC bias to the modulator according to the digital reference pulse signal of the signal processor, in which the DC bias is gradually optimized.

2. The optical intensity modulator of claim 1, wherein the optical intensity modulator further includes a pulse generator used to provide a pulse signal for the modulator and a trigger signal to the signal processor.

3. The optical intensity modulator of claim 1, wherein the optical divider comprises a fiber coupler so as to produce the first optical pulse and the second optical pulse.

4. The optical intensity modulator of claim 1, wherein the signal processor comprises:

an amplifier, used to receive and amplify the electrical pulse signal; and a signal processing unit, used to digitize the electrical pulse signal into the digital pulse signal, reduce noise of the digital reference pulse signal by averaging over a plurality of times of the electrical pulse signal, and obtain a reference value, which is different in each time.

5. The optical intensity modulator of claim 1, wherein the DC-bias generator comprises:

a control device, used to provide a control signal, which is produced according to the reference value; and a DC power supply, used to provide the DC bias to the modulator according to the control signal, wherein a current one of the control signal is compared with a previous one of the control signal and the DC bias is adjusted back-and-forth so as to optimize the DC bias after a certain period of operating time on the optical intensity modulator.

6. The optical intensity modulator of claim 5, the control signal is produced by averaging over a sufficient portion of the digital reference pulse signal at its valley region.

7. The optical intensity modulator of claim 5, the optical intensity modulator is controlled by an microprocessor with a proper interface.

8. The optical intensity modulator of claim 7, the optical intensity modulator is controlled by a computer with a general purpose interface bus (GPIB).

9. An optical intensity modulator with optimized extinction ratio (ER), suitable for a use for converting a light source into a pulse waveform, intensity modulator comprising:

a modulator, used to receive the light source and export an optical pulse;

an optical receiver, used to receive the optical pulse and convert the optical pulse into an electrical pulse signal;

a signal processor, used to receive and amplify the electrical pulse signal from the optical receiver, digitize the electrical pulse signal into a digital pulse signal, average to reduce noise of the digital reference pulse signal, and obtain a reference value; and a DC-bias generator, which is coupled to the signal processor and the modulator so as to provide a DC bias to the modulator according to the reference value of the signal processor, in which the DC bias is gradually optimized.

10. The optical intensity modulator of claim 9, wherein the optical intensity modulator further includes a pulse generator used to provide a pulse signal for the modulator and a trigger signal to the signal processor.

11. The optical intensity modulator of claim 9, wherein the signal processor comprises:

an amplifier, used to receive and amplify the electrical pulse signal; and a signal processing unit, used to digitize the electrical pulse signal into the digital pulse signal, reduce noise of the digital pulse signal by averaging over a plurality of times of the electrical pulse signal, and obtain a reference value, which is different in each time.

12. The optical intensity modulator of claim 9, wherein the amplifier comprises an erbium-doped fiber amplifier (EDFA) or a semiconductor optical amplifier.

13. The optical intensity modulator of claim 9, wherein the DC-bias generator comprises:

a control device, used to provide a control signal, which is produced according to the reference value; and a DC power supply, used to provide the DC bias to the modulator according to the control signal, wherein a current one of the reference value is compared with a previous one of the reference value and the DC bias is adjusted back-and-forth so as to optimize the DC bias after a certain period of operating time on the optical intensity modulator.

14. The optical intensity modulator of claim 13, the reference value is produced by averaging over a sufficient portion of the digital pulse signal at its valley region.

15. An optical sensor system comprising:

a laser light source, used to produce a continuous-wave laser light;

a modulator, used to receive the continuous-wave laser light and export an optical pulse;

an optical divider, used to receive the optical pulse and divide the optical pulse into a first optical pulse and a second optical pulse;

an optical receiver, used to receive the first optical pulse and convert the first optical pulse into an electrical pulse signal;

a signal processor, used to receive and amplify the electrical pulse signal from the optical receiver, digitize the electrical pulse signal into a digital pulse signal, average to reduce noise of the digital pulse signal, and obtain a reference value; and a DC-bias generator, which is coupled to the signal processor and the modulator so as to provide a DC bias to the modulator according to the reference value of the signal processor, in which the DC bias is gradually optimized.

16. The sensor system of claim 15, wherein the optical intensity modulator further includes a pulse generator used to provide a pulse signal for the modulator and a trigger signal to the signal processor.

17. The sensor system of claim 15, wherein the sensor system further comprises:

an optical amplifier, used to receive and amplify the second optical pulse; and a time division multiplexing (TDM) fiber optic sensor, coupled to the optical amplifier so as to receive an output from the optical amplifier.

18. The sensor system of claim 17, wherein the optical amplifier comprises an erbium-doped fiber amplifier (EDFA) or a semiconductor optical amplifier.

19. The sensor system of claim 15, wherein the optical divider comprises a fiber coupler so as to produce the first optical pulse and the second optical pulse.

20. The sensor system of claim 15, wherein the signal processor comprises:

an amplifier, used to receive and amplify the electrical pulse signal; and a signal processing unit, used to digitize the electrical pulse signal into the digital pulse signal, reduce noise of the digital reference pulse signal by averaging over a plurality of times of the electrical pulse signal, and obtain a reference value, which is different in each time.

21. The sensor system of claim 15, wherein the DC-bias generator comprises:

a control device, used to provide a control signal, which is produced according to the reference value; and a DC power supply, used to provide the DC bias to the modulator according to the control signal, wherein a current one of the reference value is compared with a previous one of the reference value and the DC bias is adjusted back-and-forth in each pulse cycle so as to optimize the DC bias after a certain period of operating time on the optical intensity modulator.

22. The sensor system of claim 21, the reference value is produced by averaging over a sufficient portion of the digital reference pulse signal at its valley region.

* * * * *